United States Patent [19]

Baumann

[11] Patent Number: 4,474,356
[45] Date of Patent: Oct. 2, 1984

[54] CONTROL VALVE WITH INTEGRAL STREAMLINED SEATING MEANS

[76] Inventor: Hans D. Baumann, 32 Pine St., Rye, N.H. 03870

[21] Appl. No.: 376,180
[22] Filed: May 7, 1982
[51] Int. Cl.³ .............................................. F16K 1/12
[52] U.S. Cl. .................................... 251/122; 251/124
[58] Field of Search ............... 251/121, 122, 123, 124

[56] References Cited

U.S. PATENT DOCUMENTS

| | | | |
|---|---|---|---|
| 933,468 | 9/1909 | Koenig | 251/121 X |
| 1,991,052 | 2/1935 | Derby | 251/121 |
| 3,180,360 | 4/1965 | Pavlin | 251/124 X |
| 3,979,105 | 9/1976 | Pool et al. | 251/121 |

Primary Examiner—Arnold Rosenthal

[57] ABSTRACT

A streamlined control valve with integral seating means having a flow characteristic determining contour and being part of a gradually expanding flow path formed between said contour and a movable central valve plug with a streamlined contour facing an orifice and being designed to have an abrupt area change producing configuration on its discharge side.

3 Claims, 3 Drawing Figures

CONTROL VALVE WITH INTEGRAL STREAMLINED SEATING MEANS

BACKGROUND OF THE INVENTION

This invention relates to automatic control valves used in the process industries such as refineries, chemical plants, power plants, and other industries that need to throttle gaseous or liquid media in response to electronic or pneumatic controlling signals in order to maintain a desired flow rate, tank level, process temperature, or other controlled variables.

All of these valves have to throttle and the controlled throttling area inside the valve has to vary at a mathematically pre-determined rate as function of the positioning signal to an actuating device and, therefore, the valve travel. Such a relationship is called "flow characteristic." It is typically accomplished by machining a contoured profile onto a movable valve plug which is penetrating a circular orifice or valve seat. The amount of penetration of the plug is a function of the actuating signal (and valve travel).

For certain reasons more fully discussed below, it can be more advantageous to machine such a throttling profile onto the outer extension of the seat ring bore. Such a modification of a basic control valve trim is exhibited in my prior invention, U.S. Pat. No. 3,304,949.

The purpose o the present invention is to provide a globe style control valve which offers the highest possible flow capacity with the smallest possible body opening. It should be realized that the weight of a valve, and therefore its manufacturing cost, varies nearly to the cube of its bonnet opening necessary to insert the valve plug and other parts of construction. A 2" valve having a conventional 2" valve plug and orifice will need an access opening of at least 2.5" to facilitate the internal working parts of a present state of the art control valve. My invention can provide an identical maximum flow capacity with an orifice diameter of only 1.5", therefore requiring an access opening of only 1.6", and thereby causing a weight reduction of nearly 74%. Such important weight savings are even more important when the valve material has to be a corrosion resistant alloy as is quite often the case in the chemical process industry.

A modulating control valve has basically two somewhat opposite requirements: First, it has to produce a high degree of turbulence in order to produce a sufficient conversion from kinetic to thermal energy (pressure reduction). Secondly, it has to have sufficient flow capacity when wide open to pass the mass flow that is generated at reasonable velocities by the connecting pipe size. To fulfill these requirements, a valve plug and seat ring should generate an abrupt flow pattern in the intermediate or low travel (throttling) positions to reduce pressure and a very streamlined and low fluid resistance producing profile at the maximum rated travel position in order to achieve a high flow capacity.

My invention can accomplish such requirements as will be outlined in the following detailed description, wherein.

Figure 1:
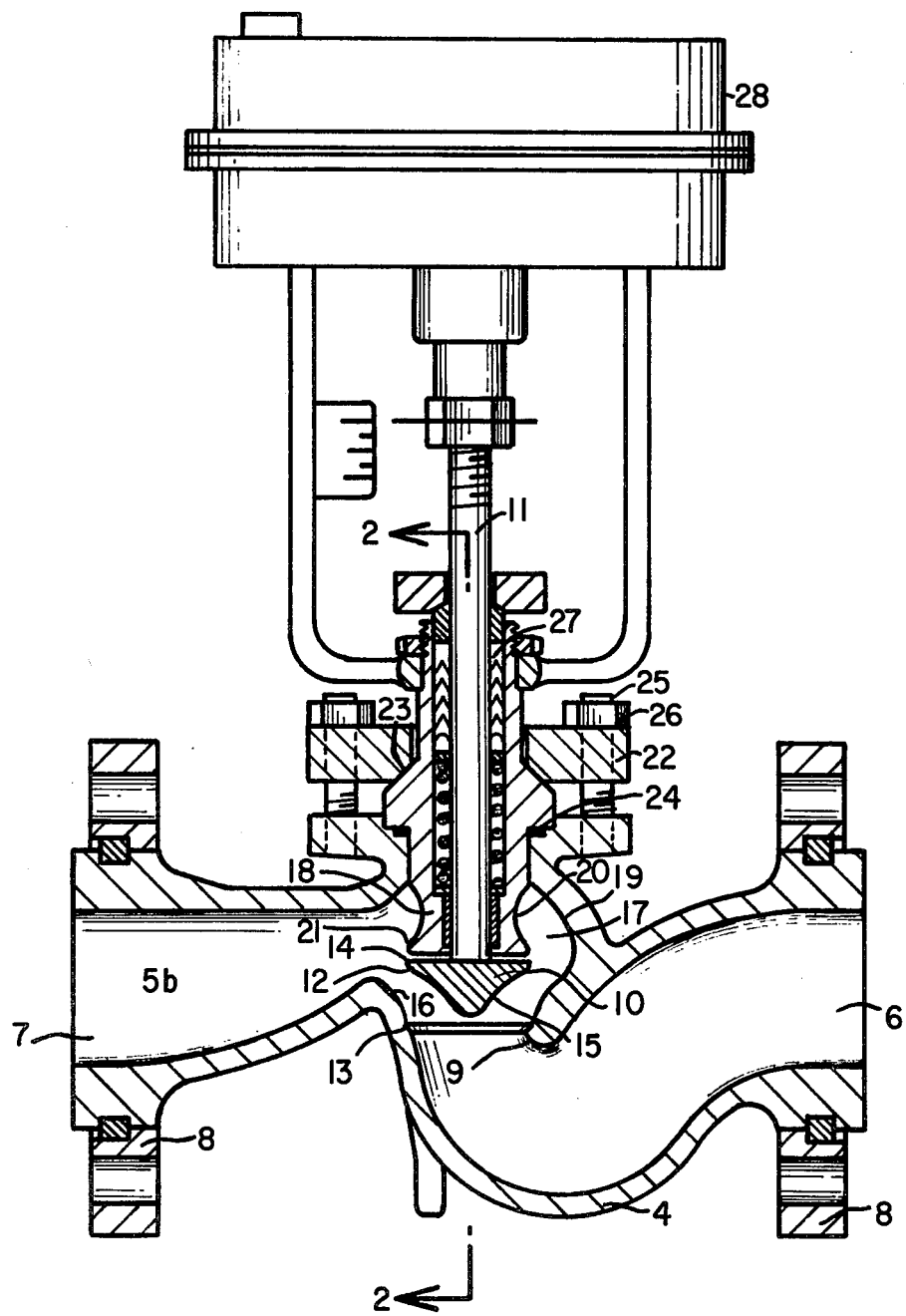
FIG. 1 is a longitudinal cross sectional view of a preferred embodiment of my invention.

Referring to FIG. 1, my invention consists of a casting 4 having central flow passages 5a and 5b extending from an inlet port 6 to an outlet port 7. Both inlet port 6 and outlet port 7 are capable of being closely coupled to a pipeline by means of slip-on flanges 8.

Figure 3:
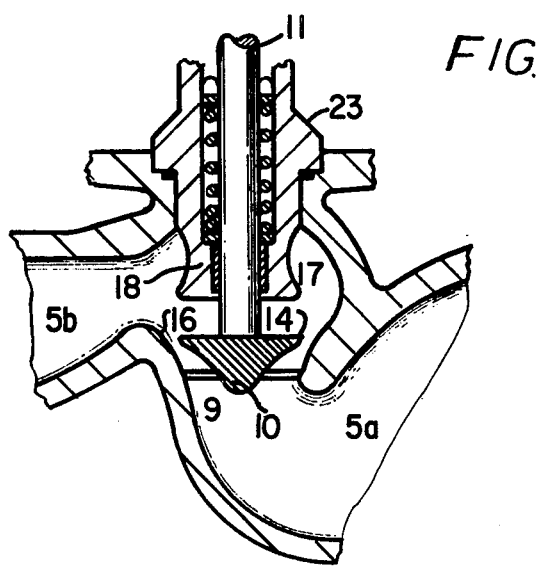
FIG. 3 is a central portion of the view in FIG. 1 with the valve plug partially extended towards the shutoff position.

The fluid passage 5a extending from inlet port 6 to a central orifice 9 is generally circular in nature and has a gradually decreasing cross sectional flow area when approaching orifice 9. A valve plug 10 being fastened to and positioned by a valve stem 11 has a seating surface 12 which, in the lowest travel position, can engage a similar seating surface 13 at the upper terminating part of orifice 9. The upper terminating end of seating chamfer 12 forms a circular rim around valve plug 10 having a relatively sharp-edged profile 14. The area extending downward from chamfer 12 is highly streamlined and well-rounded at 15 to provide low fluid flow resistance. Extending outwards from orificial seating surface 13 is a contoured surface 16 which has a profile to yield a progressively increasing flow area between any given wall portion 16 and the sharp-edged profile 14 of plug 10 at any given travel position. Such a progressive flow area change will yield a desired flow characteristic of the valve when calculated, taking into effect not only this area change, but also the additive fluid resistance phenomena that the passing fluid experiences between the inlet to the outlet port. For example, in an intermediate throttling position as indicated in FIG. 3, there is little controlled flow area between surfaces 16 and 14, resulting in relatively low fluid velocities throughout the valve passages 5a and 5b. As a result, there is little pressure loss in these packages, since such losses vary to the square of the fluid velocity. It is therefore necessary for the valve plug to provide a high degree of turbulence in order to accomplish the required pressure reduction of the fluid. This is accomplished by allowing for a rapid expansion in area around the sharp orifice-like corner 14 of valve plug 10. With increasing valve travel, there is a subsequent increase in velocity within fluid passages 5 creating added hydraulic resistance primarily due to change in direction of the fluid and therefore a lesser requirement for the valve plug to produce turbulence till, in the maximum travel position shown in FIG. 1, the valve plug merely guides the fluid from orifice 9 into a chamber 17 and around bonnet 18 towards discharge port 7. Flow passage 17 is purposely designed to maintain the approximate discharge velocity in orifice 9 to avoid deceleration losses customary with conventional globe valve designs. This near constant velocity is accomplished by profiling the inner housing wall 19 and a complementary profile of the lower portion 20 of bonnet 18. The latter terminates into a circular portion 21 having a diameter approximately identical to that of sharp edge 14 of plug 10, thereby allowing a nearly uninterrupted flow profile.

Furthermore, the curved contour 15 of plug 10 is designed to maintain a near uniform velocity profile for the fluid discharging from orifice 9 and passing between contoured surface 16 and curved plug surface 15.

Figure 2:
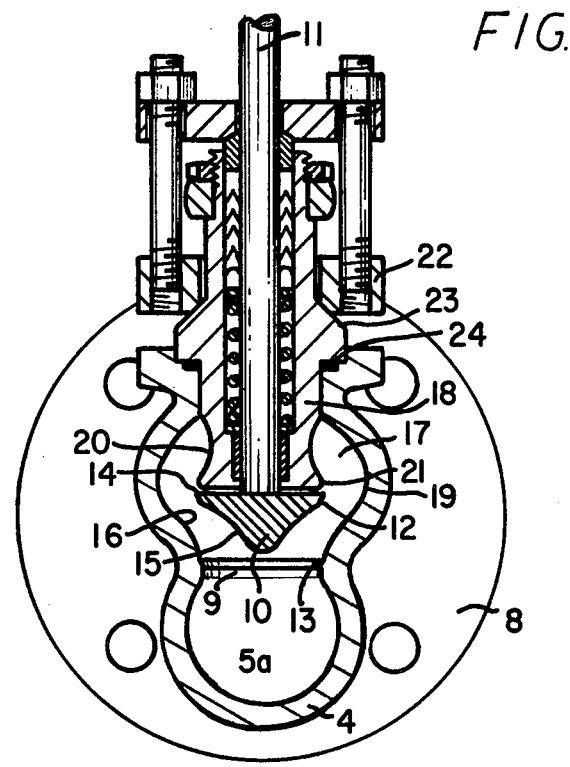
FIG. 2 is a horizontal sectional view of my invention taken along the lines 2—2 in FIG. 1.

Referring especially to FIG. 2, uniformity of velocity profile is also maintained in the area bounded by interior wall surface 19 and bonnet surface 20 commencing with passage 5a and finally discharging into passage 5b where the fluid is then allowed to gradually decelerate through enlarging passage areas of 5b into outlet port 7. By maintaining a uniform velocity profile in the maximum retracted plug position, energy losses of the moving fluid caused by rapid deceleration and acceleration as a result of drastic area changes are therefore avoided, leading to an achievement of a high fluid conductivity (flow capacity) despite a substantial reduction in orifice size due to reasons of economy. For example, a typical embodiment of my invention capable of being attached to a 2" pipe line has an orifice diameter of 1.5", yet is capable of passing approximately 54 gal/min of water at a pressure loss of 1 psi. Such flow capacity is only possible with conventional state of the art valves having orifice diameters exceeding 2".

In the lowest travel position, beveled seating surfaces 12 and 13 are engaged and lapped together to provide tight closure of the valve.

Bonnet 18 is suitably retained to housing 4 as illustrated in FIG. 1. Here, a slip-on flange 22 is holding an extended surface 23 of bonnet 18 against a gasket 24, aided by studs 25 and nuts 26. Stem 11 is sealed by conventional packing means 27. Finally, valve stem 11 and plug 10 are motivated by a state of the art actuating mechanism 28 which is not part of the invention.

Having thus described the invention in a preferred embodiment, should not be construed to limit the scope of the following claims nor the choice of material.

I claim:

1. Control valve with integral seating means and movable plug means capable of generating together low fluid flow resistant passages at the maximum retraction of said plug means from said sealing means and a turbulence and higher fluid resistant producing throttling path at lesser distances of said plug from said seating means, comprising:

(a) a valve housing having inlet and outlet ports and a central reduced diameter orifice having a longitudinal axis which is located perpendicular to the axis of the inlet or outlet port, streamlined flow passages with interior wall surfaces having gradually expanding cross sectional areas connecting said reduced diameter orifice to either the inlet or outlet port, said valve housing further incorporating a perpendicular access opening located concentric to said orifice;

(b) a beveled surface constituting seating means located at the upper terminating plane and extending diametrically outwards from said orifice;

(c) a contoured wall portion extending both vertically upwards and radially outwards from said seating surface and terminating within one of said flow passages;

(d) a movable valve plug having an outer beveled seating surface complementary to that of the orifice and lower curved wall surfaces designed to generate a nearly constant velocity profile of fluid passing from said orifice and between said contoured wall portion on one side and said curved wall surfaces of the plug when the latter is fully retracted from said orifice, said plug further having a flat terminating upper surface located slightly above said beveled seating surface to provide a sharp discontinuity for fluid flow along said curved wall surfaces;

(e) bonnet means suitably retained within said perpendicular access opening of the housing and having a lower circular portion with a central opening containing within guiding means capable of slidingly engaging a valve stem whose lower terminating end is fastened to said valve plug, the lower circular portion of the bonnet furthermore having a flat terminating surface complementary and essentially identical to the upper terminating end of the valve plug to provide continuous fluid guiding when the plug is fully retracted.

2. Control valve with integral seating means according to claim 1, wherein said contoured wall portions extending from said orifice are designed to provide a mathematically definable area and flow rate increase in conjunction with the terminating upper surface of said movable valve plug.

3. Control valve with integral seating means according to claim 1, wherein the lower circular portion of said bonnet means extends within the flow passage connecting said orifice with the outlet port, and wherein said circular portion has a profiled indenture designed to provide a near constant velocity profile for the fluid passing from said orifice and between the profiled indenture and the wall surface of said flow passage.

* * * * *